United States Patent [19]

Shiraishi et al.

[11] Patent Number: 4,786,091
[45] Date of Patent: Nov. 22, 1988

[54] DEVICE FOR LOCKING DETACHABLE ROOF IN MOTOR VEHICLE

[75] Inventors: Daiichi Shiraishi, Seto; Shingo Satoh, Sagamihara, both of Japan

[73] Assignee: Toyota Jidosha Kabushiki Kaisha, Japan

[21] Appl. No.: 27,952

[22] Filed: Mar. 19, 1987

[30] Foreign Application Priority Data

Mar. 20, 1986 [JP] Japan ................. 61-063557

[51] Int. Cl.[4] ............................................. E05C 9/04
[52] U.S. Cl. ...................... 292/36; 292/DIG. 5; 292/DIG. 62; 296/224
[58] Field of Search ................. 296/224, 137 B; 292/DIG. 62, 7, 36, 39, DIG. 5, 216, 280, 153

[56] References Cited

U.S. PATENT DOCUMENTS

| | | | |
|---|---|---|---|
| 859,531 | 7/1097 | Strauss | 292/39 |
| 3,236,551 | 2/1966 | Nash | 292/216 X |
| 3,408,100 | 10/1968 | McKay | 292/216 |
| 3,667,792 | 6/1972 | Torii | 292/216 |
| 3,788,678 | 1/1974 | Switzgoble | 292/7 |
| 4,193,618 | 3/1980 | Lee et al. | 292/39 X |
| 4,195,866 | 4/1980 | Tundo et al. | 292/DIG. 5 X |
| 4,202,571 | 5/1980 | Nishikoori | 292/216 |
| 4,540,215 | 9/1985 | Swearingen | 292/36 |

FOREIGN PATENT DOCUMENTS 60-68157  5/1985  Japan .

Primary Examiner—Richard E. Moore
Attorney, Agent, or Firm—Parkhurst, Oliff & Berridge

[57] ABSTRACT

A device for locking a detachable roof in a motor vehicle to a vehicle body. The lock device has first and second lock pins caused to appear from or disappear into the detachable roof in synchronism in directions opposite to each other by means of a control lever through first and second levers. These lock pins are inserted into lock holes formed in the vehicle body, whereby the detachable roof is fixed. The lock device further includes: a pawl capable of taking an abutting position where the pawl abuts against at least one of the first and second levers to prevent the levers from being rotated in a direction unlocking the detachable roof, and a releasing position where the pawl is not engaged with the lever; a spring for biasing the pawl in a direction in which the forward end of the pawl abuts against the lever; a release lever made engageable with the pawl only in a direction driving the forward end of the pawl to the releasing position; and a key-locking device having a key cylinder, a key cylinder lever of which can take a locking position where the key cylinder lever prevents the release lever from rocking in a direction driving the pawl and a releasing position where the key cylinder lever does not interfere with the release lever.

8 Claims, 6 Drawing Sheets

FIG. I

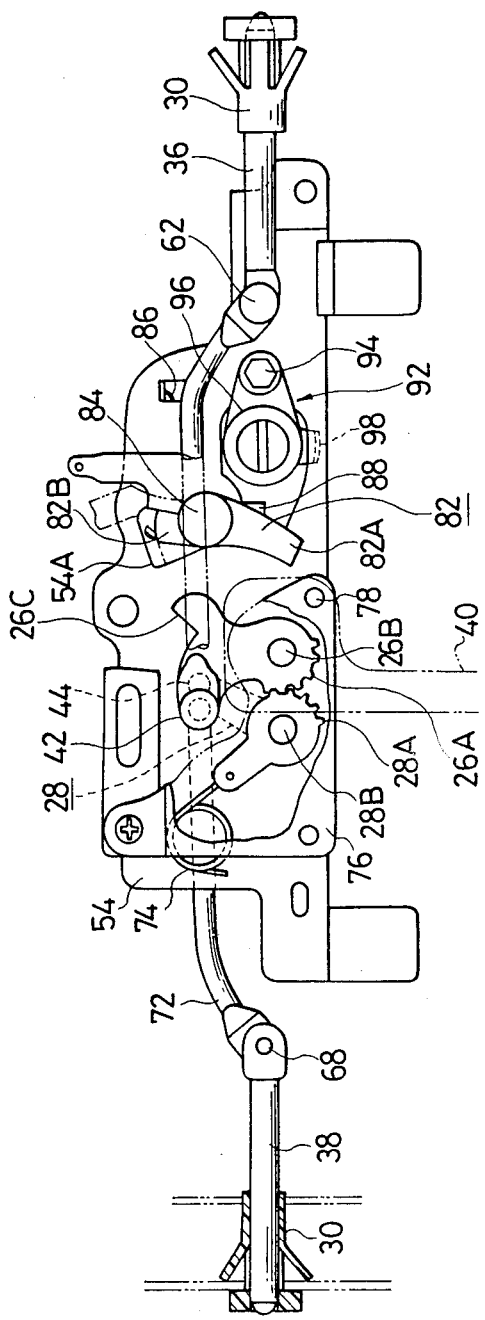

DEVICE FOR LOCKING DETACHABLE ROOF IN MOTOR VEHICLE

BACKGROUND OF THE INVENTION

1. Field of the Invention

This invention relates to improvements in a device for locking a detachable roof when the roof located upwardly of a driver's seat and a passenger's seat in a motor vehicle is made detachable.

2. Description of the Prior Art

Recently, there has been commercialized a motor vehicle having a so-called T-bar roof.

A detachable roof in the motor vehicle of the type described is constructed such that, in the detached state of the detachable roofs, openings contiguous to door openings of side doors positioned outside the driver's seat and the passenger's seat are formed to accomodate the roofs.

Furthermore, in a state where the detachable roof is mounted to a motor vehicle body, the vehicle body is formed with a roof surface flush with a roof body.

In the state where the detechable roof is mounted to the motor vehicle body, a locked state should be reliably maintained so that the detachable roof does not generate vibrations during running of the motor vehicle.

Examples of devices for locking a detachable roof in a motor vehicle for the above-described purpose are disclosed, for example, in U.S. Pat. No. 4,193,618, and Japanese Utility Model Laid-Open No. 68,157/1985.

Each of the lock devices disclosed in these examples include:

first and second levers rotatably mounted to the detachable rood and being in mesh with each other in a manner to be rotatable in synchronism with each other in directions opposite to each other;

first and second lock pins axially, linearly, movably supported on the detachable roof by means of guides at positions opposite to each other with the first and the second levers interposed therebetween, connected to the first and the second levers, respectively, through connecting mechanisms, and insertable at the forward end thereof into lock holes formed in a motor vehicle body and opposed to the lock pins; and a control lever connected to one of the first and the second levers to rotate the same.

Furthermore, in the above-described lock device, a ratchet is provided for preventing the lock device in a locked state where the first and the second lock pins are inserted into the lock holes formed on the vehicle body sides, from being brought into an unlocked state by a careless operation of the control lever by an occupant of the vehicle.

More specifically, a pawl of the ratchet is engaged with the lever, and, unless the forward end of the pawl is released from the lever, the lock pins may not be brought into the unlocked state.

However, even when the detachable roof is mounted and locked by the device for locking the detachable roof, if the key lock of the door of the motor vehicle is forgotten for example, then the device for locking the detachable roof can be easily unlocked from within the compartment, so that the detachable roof can be removed.

As a consequence, in the case as described above, such a problem is presented that there is the potential for the detachable roof to be stolen.

With respect to this problem, there has heretofore been provided no locking device on the detachable roof.

Further, the forward end of the ratchet is constantly biased by a spring in a direction of being engaged with the lever, and hence, it is troublesome to project the lock pins for locking as the ratchet must be operated against the biasing force of the spring.

SUMMARY OF THE INVENTION

It is an object of the present invention to provide a device for locking a detachable roof in a motor vehicle, wherein, with a simplified construction, the device for locking the detachable roof is key locked, so that the detachable roof cannot be easily removed.

It is another object of the present invention to provide a device for locking a detachable roof in a motor vehicle wherein, a lever can be turned in a direction of locking without operating a ratchet for maintaining a lock or the like, during the locking operation.

To achieve the above-described object, the present invention contemplates a device for locking a detachable roof in a motor vehicle, comprising:

first and second levers rotatably mounted to the detachable roof and being in contact with each other in a manner to be rotatable in synchronism with each other in directions opposite to each other;

first and second lock pins axially, linearly, movably supported on the detachable roof by means of guides at positions opposite to each other with the first and the second levers interposed therebetween, connected to the first and the second levers, respectively, through connecting mechansims, and insertable at the forward ends thereof into lock holes formed in a motor vehicle body and opposed to the lock pins; and a control lever connected to one of the first and the second levers to rotate the same, wherein the device further comprises:

a pawl rockingly supported by a rotary shaft, the forward end of which can take an abutting position where the forward end thereof abuts against at least one of the first and the second levers in the locked state in which the first and the second lock pins are projected, so as to prevent the lever from being rotated in a direction unlocking the lever, and a releasing position where the forward end thereof is not engaged with the lever;

a spring for biasing the pawl in a direction in which the forward end of the pawl abuts against the lever;

a release lever rockingly journaled and made engageable with the pawl only in a direction driving the forward end of the pawl to the releasing position; and a key-locking device provided contiguously to the release lever and having a key cylinder, a key cylinder lever of which can take a locking position where the key cylinder lever abuts against the release lever to prevent the release lever from rocking in a direction of driving the pawl, and a releasing position where the key cylinder lever does not interfere with the release lever.

To achieve the above-described object, the present invention contemplates that the lever has an engageable recess, with which the formed end of the pawl is engaged in the locked state in which the first and the second lock pins are projected, and the forward end of the pawl is pushed in a direction of unlocking against the biasing force of the spring when the lever is rotated from the unlocked state to the locked state.

To achieve the above-described object, the present invention contemplates that the pawl and the release lever are supported in a manner to be coaxially and rockingly movable and shifted in position in an axial direction with respect to each other, and the end opposite to the forward end of the pawl is bent in the axial direction wherein said bent portion can abut against the release lever.

To achieve the above-described object, the present invention contemplates that the first and the second levers, the pawl and the release lever are journaled on one and the same base plate in a manner to be rotated in parallel to said base plate, the end opposite to the forward end of the pawl is bent in an axial direction of the rotational axis of the pawl and projected to the other side through a hole formed in the base plate, and one end of the spring is engaged with the bent portion projected to the other side through the hole.

According to the present invention, the key locking device is provided contiguously to the release lever and the release lever is locked or unlocked by the key cylinder lever of the locking device, so that the detachable roof can be key locked with simplified construction, and the lever can be driven to cause the lock pins to remain in the locked position.

Furthermore, the pawl engageable with the lever for driving the lock pins is driven only in a direction of releasing by the release lever provided separately of the pawl, so that, to drive the lever in a direction of locking, the lever can be rotated in the direction of locking to the locking position without the release lever being operated.

BRIEF DESCRIPTION OF THE DRAWINGS

FIG. 6 is a plan view showing the unlocked state in the above embodiment, similar to FIG. 4.

DETAILED DESCRIPTION OF THE PREFERRED EMBODIMENT

Description will hereunder be given of the embodiment of the present invention with reference to the drawings.

Figure 1:
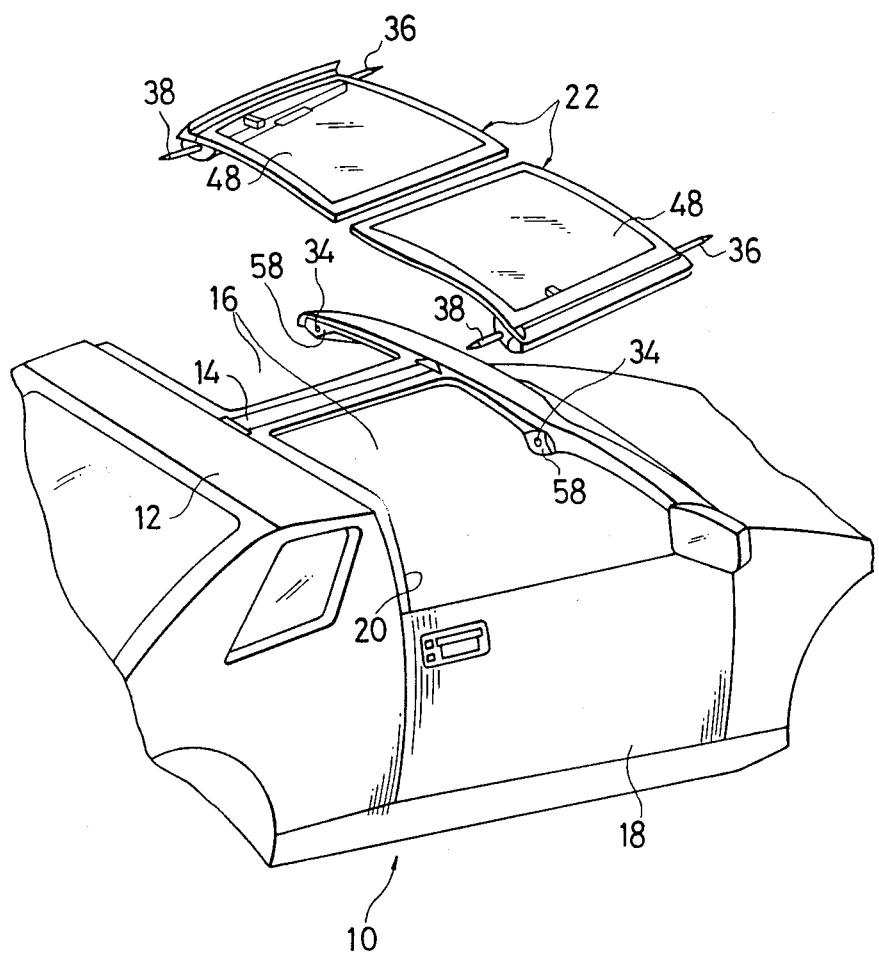
FIG. 1 is a disassembled perspective veiw showing the detachable roof in a motor vehicle, to which the lock device according to the present invention is applied, and the proximity of the roof in the motor vehicle.

As shown in FIG. 1, a roof 12 in a motor vehicle 10 is formed with a pair of right and left roof openings 16 located at positions on the opposite sides of a center bar 14, center bar 14 interposed therebetween, at positions above a driver's seat and a passenger's seat.

Each of the roof openings 16 are contiguous to a door opening 20 for a side door 18.

A pair of right and left detachable roofs 22 according to the present invention are accomodated in the roof openings 16 in a manner to close the pair of openings 16. A lock device 24 for fixing the detachable roof 22 to the motor vehicle 10 with the roof opening 16 being closed includes: a first lever 26 and a second lever 28 rotatably mounted to the detachable roof 22 and being in mesh with each other by means of gears 26A and 28A thereof in a manner to be rotatable in synchronism with each other in directions opposite to each other; first and second lock pins 36 and 38 axially, linearly, movably supported on the detachable roof 22 by means of guides 30 at positions opposite each other in the longitudinal directions of a vehicle body connected to the first and the second levers 26 and 28 interposed therebetween, respectively, through connecting mechanisms 32, and insertable at the forward ends thereof into lock holes 34 formed in the roof 12 opposed to the lock pins 36 and 38; and a control lever 40 connected to the first lever 26 to rotate the same; wherein the device further comprises:

a pawl 82 rockingly supported by a rotary shaft 84, a forward end 82A of which can take an abutting position where the forward end 82A engages an engageable recess 26C of the first lever 26 in the locked state in which the first and the second lock pins 36 and 38 are projected, so as to prevent the first lever 26 from being rotated in a direction of unlocking the first lever 26 and a releasing position where the forward end 82A does not engage the first lever 26;

a tensile coil spring 86 for biasing the pawl 82 in a direction in which the forward end 82A of the pawl 82 abuts against the first lever 26; and a release lever 88 provided rockingly and coaxially with the pawl 82 and made engageable with the pawl 82 only in a direction of driving the forward end 82A of the pawl 82 to the releasing position.

A key-locking device 92 is provided contiguously to the release lever 88.

The key-locking device 92 has a key cylinder 96, a key cylinder lever 98 of which can take a locking position where the key cylinder lever 98 abuts against the release lever 88 to prevent the release lever 88 from rocking in a direction of driving the pawl 82 to the release position, and a releasing position where the key cylinder lever 98 does not interfere with the release lever 88. The key cylinder lever 98 is secured to a key rotor, not shown, of the key cylinder 96.

Figure 2:
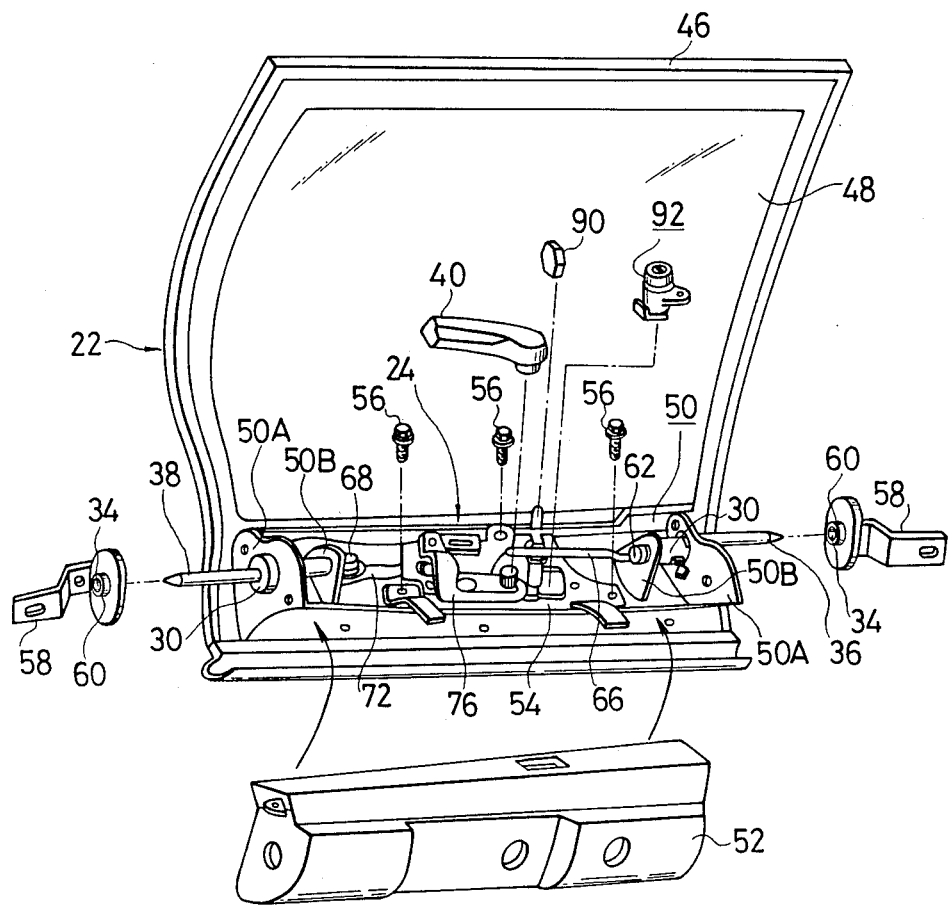
FIG. 2 is a disassembled perspective view showing the detachable roof provided with the lock device according to the present invention.

Designated at 48 in FIGS. 1 and 2 is a glass pane constituting a main part of the detachable roof 22; at 50, a lock base secured to the undersurface of an outer end portion of the glass pane 48 in the widthwise direction of the vehicle body; at 52, a garnish for shielding the outer surface of the lock base 50; and at 46, a molding for protecting a tail end portion of the glass pane 48.

As shown in FIG. 2, a portion of the lock device 24 excluding the guides 30 is secured to a base plate 54, which is locked and fixed to the lock base 50 through three bolts 56.

The guides 30 for guiding the first lock pin 36 and the second back pin 38 are secured to the lock base 50.

Furthermore, the lock holes 34 are each formed in a guide bush 60 inserted into a bracket 58. As shown in FIG. 1, the brackets 58 are secured to outer side positions in the widthwise directions of the vehicle body of the front end face and the rear end face, not shown, of the roof openings 16 in the roof 12.

Figure 3:
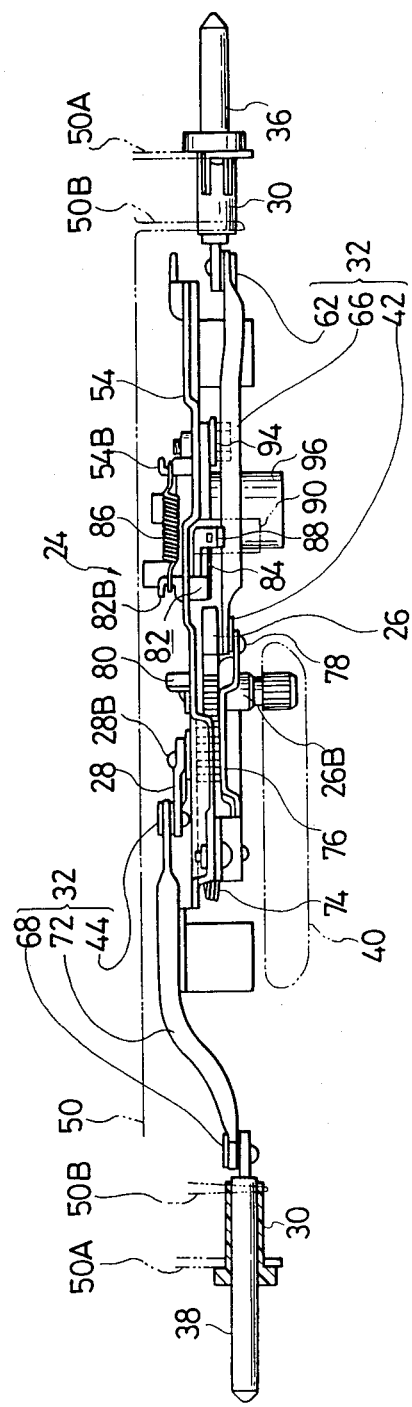
FIG. 3 is a front view showing an embodiment of the lock device according to the present invention.

The base plate 54 is spaced apart from the bottom face of the lock base 50 (Refer to FIG. 3).

The first lever 26 is disposed on the front surface of the base plate 54, i.e., on the side of the garnish 52. The second lever 28 is disposed on the rear surface of the plate 54, i.e., in a space formed between the bottom face of the lock base 50 and the base plate 54.

The base plate 54, the first lever 26 and the second lever 28 are in parallel to one another.

As a consequence, a rotary shaft 26B of the first lever 26 and a rotary shaft 28B of the second lever 28 perpendicularly intersect the base plate 54, and are in parallel to each other.

Here, the gear 28A of the second lever 28 is formed on a portion of the rotary shaft 28B, protruding from the base plate 54 to the outer side.

More specifically, the main body of the second lever 28 and the gear 28A are arranged on the rear surface and the front surface of the base plate 54, respectively, with the base plate 54 interposed therebetween, and being shifted in position from each other in the axial direction of the rotary shafts 26B and 28B.

The gear 26A of the first lever 26 is formed integrally with the main body of the first lever 26 on the front surface of the base plate 54.

The connecting mechanisms 32 include: a first link 66 connected at one end thereof to the proximal end of the first lock pin 36 through a pin 62 and at the other end thereof to the first lever 26 through the pine 42; and the second link 72 connected at one end thereof to the proximal end of the second lock pin 38 through a pin 68 and at the other end thereof to the second lever 28 through the pin 44. The first link 66 and the second link 72 convert the rotary motions of the first and the second levers 26 and 28 into reciprocatory motions and transmit the same to the first and the second lock pins 36 and 38, respectively.

Here, as shown in FIG. 3, the first lock pin 36 and the second lock pin 38 are disposed generally in parallel to and substantially on the same axial line as the base plate 54, the first lever 26 and the second lever 28.

Furthermore, the first link 66, and the pins 42 and 62 provided at opposite ends thereof are arranged substantially in the same plane as the first lock pin 36 and the second lock pin 38.

In contrast thereto, the second link 72 is curved upwardly in FIG. 3 from the pin 68 on the side of the second lock pin 38, extending to the rear side of the base plate 54 and is connected to the second lever 28 through the pin 44.

Figure 4:
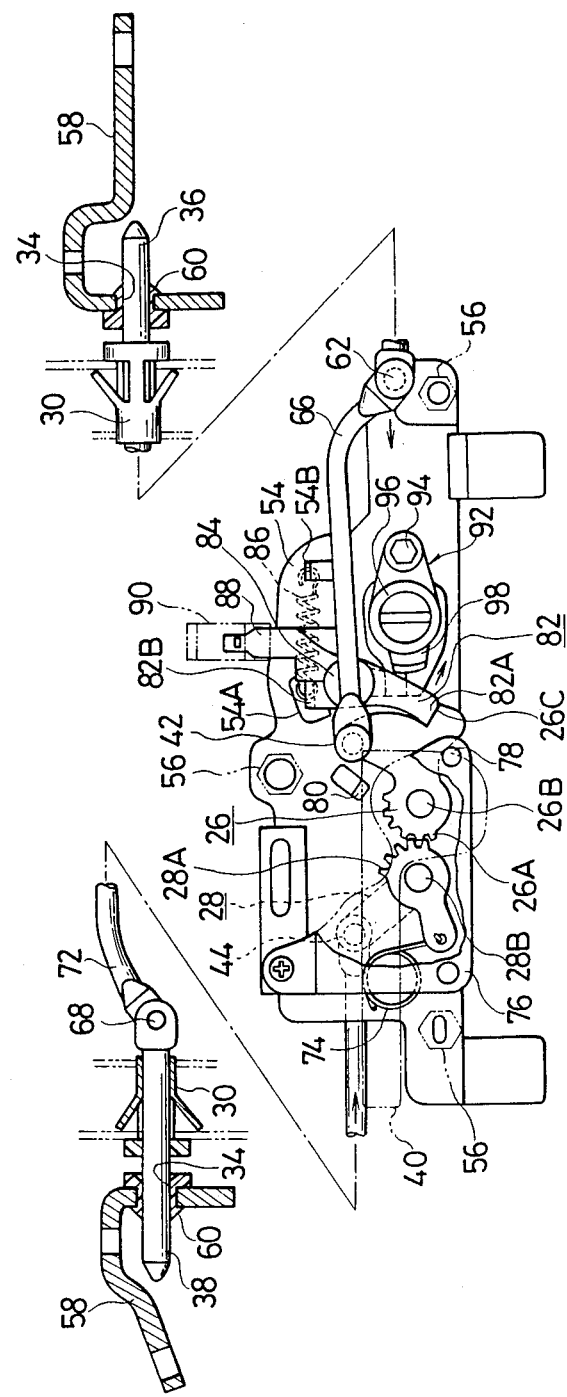
FIG. 4 is a plan view showing the above embodiment as seen looking from an automobile passenger compartment.

Designated at 74 in FIGS. 3 and 4 is a snap action spring confined between the base plate 54 and the second lever 28, for biasing the second lever 28 in the projecting and retracting directions of the lock pin. Denoted at 76 is a sub-base secured to the base plate 54 in a manner to rotatably support the ends of one side of the rotary shafts 26B and 28B of the first and the second levers 26 and 28 and to shield the gears 26A and 28A from the front side.

The first lever 26, when rotated in the clockwise direction in FIG. 4, drives the first lock pin 36 in the projecting direction thereof through the first link 66, and, when rotated in the counterclockwise direction, drives the first lock pin 36 in the retracting direction thereof.

Furthermore, the second lever 28 is adapted to drive the second lock pin 38 in a direction reverse to the first lever 26.

Provided on the base plate 54 are first and second stoppers 78 and 80 for controlling rotations of the first and the second levers 26 and 28 in the projecting and the retracting directions thereof.

The first stopper 78 comprises one of a plurality of pins for supporting the sub-base 76.

Furthermore, the second stopper 80 is formed by cutting and bending (shaving) a portion of the base plate 54 toward the rear side thereof.

As shown in FIG. 4, the first lever 26 abuts against the first stopper 78 in the clockwise direction, and the second lever 28 abuts against the second stopper 80 in the clockwise direction.

The pawl 82 is supported by a shaft 84 in a manner to rock about the shaft 84 on the front surface of the base plate 54.

The forward end 82A and the pawl 82 may take either one of two positions including a position where it engages an engageable recess 26C formed in the first lever 26 to preclude rotation of the first lever 26 in the counterclockwise direction when the first lever 26 rotates in the clockwise direction to abut against the first stopper 78 and a position where it is disengaged from the engageable recess 26C to permit rotation of the first lever 26 in the counterclockwise direction.

The other end 82B of the pawl 82 is bent at right angle in a manner to be projected toward the rear side of the base plate 54 through a hole 54A formed in the base plate 54.

The base plate 54 is formed with a struck out part 54B raised toward the rear side of the base plate 54 at a position spaced apart from the hole 54A in the direction toward the first lock pin 36.

A tension coil spring 86 if provided between the struck out part 54B and the other end 28B of the pawl 82, whereby the pawl 82 is biased in the clockwise direction in FIG. 4, i.e., in the direction in which the forward end 82A is engaged with the engageable recess 26C of the first lever 26.

A release lever 88 is coaxially and rotatably supported on the rotary shaft 84 rotatably supporting the pawl 82. This release lever 88 abuts against the other end 82B of the pawl 82 in the counterclockwise direction in FIG. 4, so that the other end 82B can be driven by the release lever against the tensile force of the tension coil spring 86 in the counterclockwise direction. Furthermore, the release lever 88 is adapted to be freely rotatable with the pawl 82 in the clockwise direction in FIG. 4.

Denoted at 90 in FIG. 4 is a control knob secured to the forward end of the release lever 88.

The key-locking device 92 is fixed to the base plate 54 by a bolt 94. In the key-locking device 92, when the key cylinder 98 is at a stroke end position in the clockwise direction as shown in FIG. 4, the key cylinder lever 98 abuts against the release lever 88 to prevent the release lever 88 from rotating in the counterclockwise direction, i.e., rotating in the direction to drive the pawl 82 in the counterclockwise direction.

Furthermore, when rotated in the counterclockwise direction in FIG. 4, the key cylinder lever 98 allows the release lever 88 to move in the counterclockwise direction to drive the pawl 82 in the counterclockwise direction, whereby the forward end 82A slips out of the engageable recess 26C of the first lever 26.

As shown in FIGS. 3 and 4, the guides 30 for guiding the first lock pin 36 and the second lock pin 38 in the axial direction are supported on two pairs of ribs 50A formed at opposite end positions in the longitudinal direction of the vehicle and 50B formed at positions slightly inwardly spaced apart from the opposite end positions.

Description will hereunder be given of the action of this embodiment.

The lock device 24 shown in FIGS. 3 and 4 is in the locked state when the detachable roof 22 is mounted to the roof opening 16.

In this state, the first and the second lock pins 36 and 38 are in the positions projecting in the directions of the forward ends, respectively, and inserted in the lock holes 34 on the vehicle body sides, whereby the detachable roof 22 cannot be detached.

In this state, the first lever 26 abuts against the first stopper 78.

Furthermore, the forward end 82A of the pawl 82 is engaged with the engageable recess 26C of the first lever 26, whereby the first lever 26 is prevented from rotating in the counterclockwise direction in FIG. 4, i.e. rotating in the unlocking direction.

This state of the pawl 82 is maintained by the tensile force of the tension coil spring 86.

Furthermore, as shown in FIG. 4, when the key-locking device 92 is held in the locked state, the key cylinder lever 98 thereof is in the position of abutting against the release lever 88, whereby the release lever 88 is prevented from rotating, so that the formed end 82A of the pawl 82 cannot slip out of the engageable recess 26C of the first lever 26.

Figure 5:
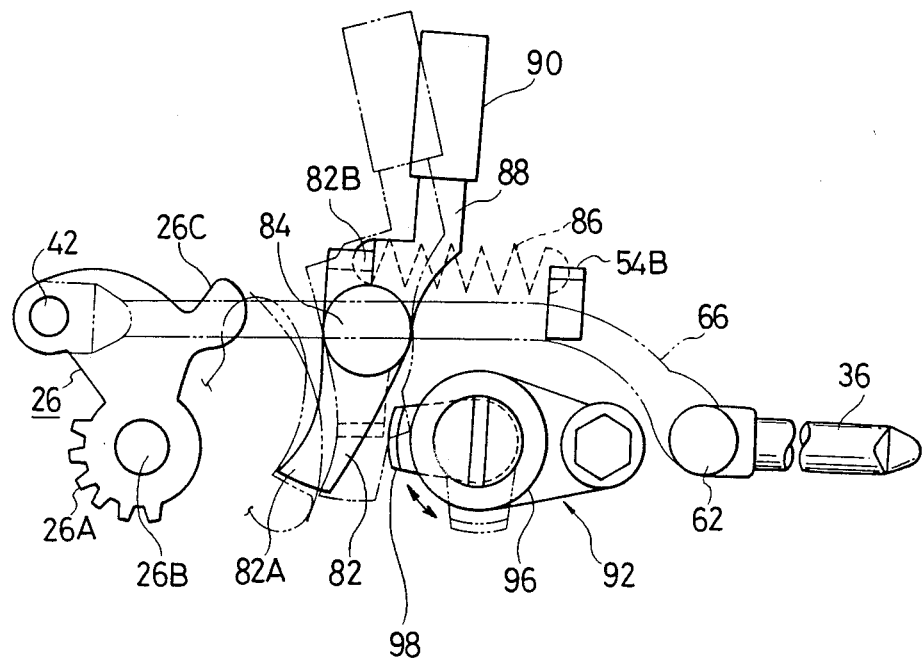
FIG. 5 is a general plan view showing the positional relationship between the first lever, a locking pawl, a release lever and a locking device.

Subsequently, when a key, not shown, is inserted into the key cylinder 96 and driven in the unlocking direction, the release lever 88 can rotate in the lock releasing direction, i.e., the counterclockwise direction in the drawings as shown in FIGS. 5 and 6.

Therefore, turning of the knob 90 by an occupant of the motor vehicle in the counterclockwise direction causes the release lever 88 to drive the pawl 82 in the counterclockwise direction, whereby the forward end 82A is disengaged from the engageable recess 26C of the first lever 26.

Subsequently, when the control lever 40 is rotated from a position shown in FIG. 4 through about 90° in the counterclockwise direction, the first lever 26 connected thereto is similarly rotated through about 90° in the counterclockwise direction.

Simultaneously, the second lever 28 operationally associated with the first lever 26 via the gears 26A and 28A rotates through about 90° in the clockwise direction.

Turning motions of the first lever 26 and the second lever 28 are converted by the first link 66, the pins 62 and 42, and the second link 72, and the pins 68 and 44 as being the connecting mechanisms 32, into motion retracting the first lock pin 36 and the second lock pin 38, respectively. These retracting motions are transmitted to the first and the second lock pins 36 and 38. Accordingly, the first and the second lock pins 36 and 38 are brought into retracted states as shown in FIG. 6 and a major portion of these lock pins are retracted inwardly of the guides 30.

As a consequence, the first lock pin 36 and the second lock pin 38 are disengaged from the lock holes 34 formed in the vehicle body sides, so that the detachable roof 22 can be removed from the roof 12.

At this time, as shown in the planar view of FIG. 6, the first lever 26 and the second lever 28 are overlapped with each other in the thicknesswise direction of the levers. However, the first and the second levers 26 and 28 are shifted in position from each other as described above, so that these levers do not interfere with each other.

Therefore, sufficient strokes of the pins 42 and 44 can be taken, whereby reciprocatory strokes of the first and the second lock pins 36 and 38 can be extended. Thus, the lengths of the lock pins 36 and 38 inserted into the lock holes 34 can be extended.

Additionally, after the first and the second levers 26 and 28 are rotated through a predetermined angle in the unlocking direction, even if the release lever 88 biased by spring 86 is release to a free condition, the forward end 82A of the pawl 82 merely lays idle away from the first lever 26 so that the forward end 82A does not interfere with the rotations of the first and the second levers 26 and 28.

Furthermore, when the first and the second lock pins 36 and 38 are projected from the unlocked states as shown in FIG. 6 to be engaged with the lock holes 34, the control lever 40 is rotated in a direction reverse to the above.

At this time, the first lever 26 interferes with the forward end 82A of the pawl 82, however, if the pawl 82 is pushed against the tensile force of the tension coil spring 86 in the counterclockwise direction in FIG. 6, then the first lever 26 returns together with the second lever 28 to the locked states as shown in FIG. 4.

As a consequence, the first and the second levers 26 and 28 can be operated into the locked states without operating the release lever 88 at all and without causing the release lever 88 to actuate.

When rotated in the direction of being disengaged from the first lever 26, the pawl 82 is not operationally associated with the release lever 88 (release lever 88 acts only in a pushing made against end 82B of pawl 82) as described above, so that rotation of the pawl 82 to a retracted position cannot be prevented by the release lever 88.

As a consequence, even if the key cylinder lever 98 is located at a position of preventing the rotation of the release lever 88, the first lever 26 can be rotated to the locking position regardlesss of the location of the key cylinder lever 98.

Additionally, in the above embodiment, the first lever 26 and the second lever 28 are operationally associated with each other through the meshing engagement of the gears 26A and 28A, however, the present invention need not necessarily be limited to this, and the first and the second levers 26 and 28 may be other types which can rotate in directions opposite to and in synchronism with each other.

For example, both levers may be brought into synchronism by frictional contact and rotated in directions opposite to each other. More specifically, the first lever 26 and the second lever 28 may be in the relationship of contact including sliding contact such as gears and frictional contact such as friction wheels.

Furthermore, in the above embodiment, the connecting mechanism 32 interposed between the lock pin and the lever includes the link and the pins on the opposite ends of the link. However, in short, the connecting mechanisms 32 may be other types which can convert the turning motions of the first and the second levers 26 and 28 into the reciprocatory motions of the first and the second lock pins 36 and 38. As a consequence, the connecting mechanisms 32 may be ones in which the first and the second lock pins 36 and 38 are connected to the first and the second levers 26 and 28 without the links.

Furthermore, the rotary shafts 26B and 28B of the first and the second levers 26 and 28 are disposed in parallel to each other. However, the present invention need not necessarily be limited to this, and an arrangement may be adopted such that, in short, a portion of the first lever 26 in the proximity of the pin 42 being the connecting point of the connecting mechanism 32 of the first lever 26, and a portion of the second lever 28 in the proximity of the pin 44 of the second lever 28 are shifted in position from each other in a manner not to interfere with each other in the thicknesswise direction of the levers in the unlocked states. In such arrangement, the two rotary shafts 26B and 28B may support the first and the second levers 26 and 28 such that the rotary planes of the first and the second levers are in a torsional relationship with each other.

What is claimed is:

1. A device for locking a detachable roof in a motor vehicle, comprising:
   first and second levers rotatably mountable to said detachable rood in contact with each other in a manner to be rotatable in synchronism with each other in directions opposite to each other;
   first and second lock pins axially, linearly, movably supportable on said detachable roof by means of guides mounted at positions opposite to each other on said detachable roof and with the first and second levers therebetween, connected to the first and second levers, respectively, through connecting mechanisms, and insertable at forward ends therof into lock holes formed in a motor vehicle body and opposed to the lock pins; and a control lever connected to one of the first and the second levers to rotate the same, wherein said device further comprises:
   a pawl rockingly supported by a rotary shaft, a forward end of which can take an abutting position where the forward end thereof abuts against at least one of the first and the second levers in a locked state in which the first and the second lock pins are projected, so as to prevent the levers from being rotated in a direction unlocking the detachable roof, and a releasing position where the forward end thereof is not engaged with the lever;
   a spring for biasing said pawl in a direction in which the forward end of said pawl abuts against the at least one of said levers;
   a release lever rockingly journaled and made engageable with said pawl only in a direction of driving the forward end of said pawl to the releasing position; and
   a key-locking device provided contiguously to said release lever and having a key cylinder, said key cylinder having a key cylinder lever which can take a locking position wherein said key cylinder lever abuts against said release lever to prevent said release lever from rocking in a direction of driving said pawl, and a releasing position wherein said key cylinder lever does not interfere with said release lever.

2. The device for locking a detachable roof in a motor vehicle as set forth in claim 1, wherein the at least one of said levers has an engageable recess, with which the forward end of said pawl is engaged in the locked state in which the first and the second lock pins are projected, and the forward end of said pawl is pushed in an unlocking direction against the biasing force of said spring when the at least one of said levers is rotated from the unlocked state to the locked state.

3. The device for locking a detachable roof in a motor vehicle as set forth in claim 1, wherein said pawl and said release lever are coaxially rockingly supported, and spaced with respect to each other in an axial direction, and the end opposite to the forward end of said pawl is bent in said axial direction wherein said bent portion can abut against said release lever.

4. The device for locking a detachable roof in a motor vehicle as set forth in claim 2, wherein said pawl and said release lever are coaxially rockingly supported, and spaced with respect to each other in axial direction, and the end opposite to the forward end of said pawl is bent in said axial direction wherein said bent portion can abut against said release lever.

5. The device for locking a detachable roof in a motor vehicle as set forth in claim 1, wherein said first and second levers, said pawl and said release lever are journaled on one and the same base plate in a manner to be rotated in parallel to said base plate, the end opposite to the forward end of said pawl is bent in an axial direction of said rotary shaft of the pawl and projected to an opposite side of said base plate through a hole formed in said base plate, and one end of said spring is engaged with said bent portion projected to the other side of said base plate.

6. The device for locking a detachable roof in a motor vehicle as set forth in claim 2, wherein said first and second levers, said pawl and said release lever are journaled on one and the same base plate in a manner to be rotated in parallel to said base plate, the end opposite to the forward end of said pawl is bent in an axial direction of said rotary shaft of the pawl and projected to an opposite side of said base plate through a hole formed in said base plate, and one end of said spring is engaged with said bent portion projected to the other side of said base plate.

7. The device for locking a detachable roof in a motor vehicle as set forth in claim 3, wherein said first and second levers, said pawl and said release lever are journaled on one and the same base plate in a manner to be rotated in parallel to said base plate, the end opposite to the forward end of said pawl is bent in an axial direction of said rotary shaft of the pawl and projected to an opposite side of said base plate through a hole formed in said base plate, and one end of said spring is engaged with said bent portion projected to the other side of said base plate.

8. The device for locking a detachable roof in a motor vehicle as set forth in claim 4, wherein said first and second levers, said pawl and said release lever are journaled on one and the same base plate in a manner to be rotated in parallel to said base plate, the end opposite to the forward end of said pawl is bent in an axial direction of said rotary shaft of the pawl and projected to an opposite side of said base plate through a hole formed in said base plate, and one end of said spring is engaged with said bent portion projected to the other side of said base plate.

* * * * *